Figure 1:
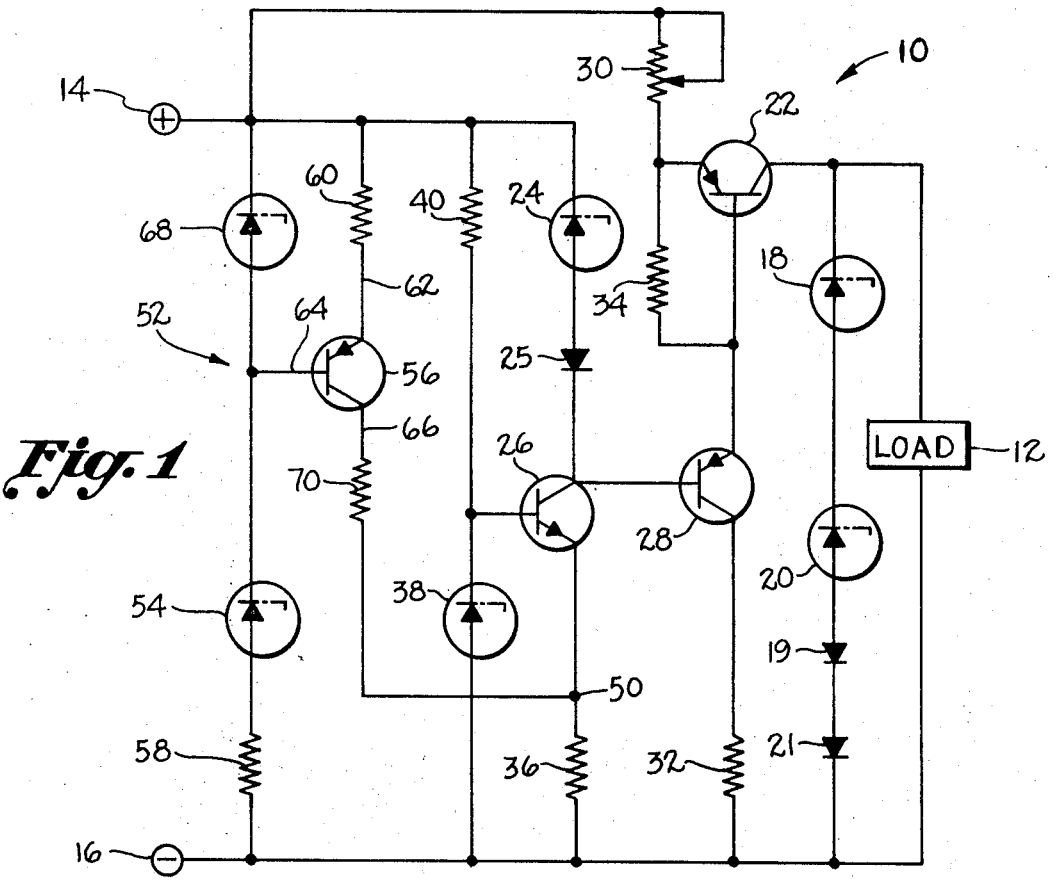

United States Patent

[11] 3,579,039

[72] Inventor Ivan R. Damon
 Tinley Park, Ill.
[21] Appl. No. 799,678
[22] Filed Feb. 17, 1969
[45] Patented May 18, 1971
[73] Assignee SCM Corporation
 New York, N.Y.

[54] SURGE PROTECTION CIRCUIT
 16 Claims, 2 Drawing Figs.
[52] U.S. Cl. ................................................. 317/22,
 317/31, 317/33, 317/50, 323/9
[51] Int. Cl. ................................................... H02h 3/22
[50] Field of Search ........................................ 317/50, 22,
 31, 33 (VR); 323/9, 22 (T), (Inquired), 4

[56] References Cited
UNITED STATES PATENTS
3,048,718 8/1962 Starzec et al. ................ 317/33X
3,049,632 8/1962 Staples ......................... 317/33X Primary Examiner—James D. Trammell
Attorney—Mason, Kolehmainen, Rathburn & Wyss ABSTRACT: A regulated power supply is protected from input potential surges by a transistor and Zener diode input network which shuts down the regulated supply whenever the input potential exceeds a predetermined maximum level. When an input potential surge occurs, current flows through a Zener diode and transistor series circuit connected across the input terminals, and a shutdown current flows from the transistor into a shutdown node within the power supply.

Patented May 18, 1971

3,579,039

Inventor
IVAN R. DAMON

Mason, Kolehmainen,
Rathburn & Wyss
Attorneys

SURGE PROTECTION CIRCUIT

The present invention relates to regulated power supplies, and more particularly to protective circuits for shutting down a regulated power supply to protect it against input potential surges.

Transistorized regulated power supplies are widely used to supply constant currents or voltages to electronic circuits. A typical regulated supply generally comprises a series regulating element connected in series with a load across a source of unregulated potential, a Zener diode potential reference element, and circuitry for comparing the Zener reference potential with either the output voltage or current and for varying the conduction of the series regulating element so as to maintain the output voltage or current constant both in the face of input potential fluctuations and load fluctuations.

A major problem in the design of such supplies is conducting heat away from the series regulating element. Generally this element must be designed to dissipate power quantities comparable in magnitude to the power dissipated by the entire load. The heat dissipation problem becomes especially critical in compact, portable devices wherein the space available for heat sinks and heat-radiating devices is at a premium. Not only is it necessary to protect the series regulating element from the destructive effects of heat generated under normal operating conditions, but it is also necessary to provide protection against heat generated during current overload or input potential transients. In the case of a constant voltage power supply, current overload protection is usually built into the supply, so no additional heat sinking is required. It has been the customary practice to provide no electronic protection against input potential transients, however. The customary practice has been to choose a heat sink having sufficient capacity to provide protection against the worst possible case of excessive input potential. Since input potential transients often are half again greater than the normal system input potential, it is often necessary to provide twice the heat dissipation capacity required to handle normal circuit requirements merely as protection against occasional input voltage overload.

A primary object of the present invention is therefore before the construction of a regulated power supply having a heat dissipation element that is as small and as compact as possible, and which is designed to dissipate only the heat encountered under normal operating conditions.

Another object of the present invention is the construction of a regulated power supply that includes a surge protector which terminates the output current during periods when the input potential exceeds a predetermined maximum level, and which automatically returns the supply to a regulating state when the input potential drops below the predetermined maximum level.

A further object of the present invention is the provision of such a supply wherein the termination of the output current occurs at electronic speeds, so that the power supply and the load are protected against transitory input potential surges.

In accordance with these and many other objects, the present invention comprises a regulated power supply which includes a circuit that automatically shuts down the supply when the supply input potential exceeds a predetermined maximum level. This regulating circuit includes a first Zener diode connected in series with the base-emitter junction of a transistor across the source of input potential. The Zener diode is chosen to have a Zener potential which is approximately equal to the potential at which it is desired to shut down the supply. Current-limiting resistors can be included in series with the Zener diode, and in series with the emitter lead of the transistor. A shutdown current then flows from the collector of the transistor whenever the input potential exceeds the Zener potential of the Zener diode.

This shutdown current is used to turn off the regulated power supply. In a preferred embodiment of the invention, the regulated power supply includes a Zener diode reference element that is supplied with a constant current from a conventional Zener diode and transistor constant current source. In the case of such a supply, the shutdown current is used to bias off the transistor in the constant current source and thereby terminate the constant current. This causes the voltage across the Zener reference element to collapse and thereby causes the supply to shut down. The magnitude of the shutdown current is limited by a second Zener diode connected between the base of the shutdown current transistor and the input potential supply terminal connected to the emitter of this transistor. Heat dissipation in the shutdown current transistor can be limited by inserting a resistor in the path of the shutdown current.

Figure 2:
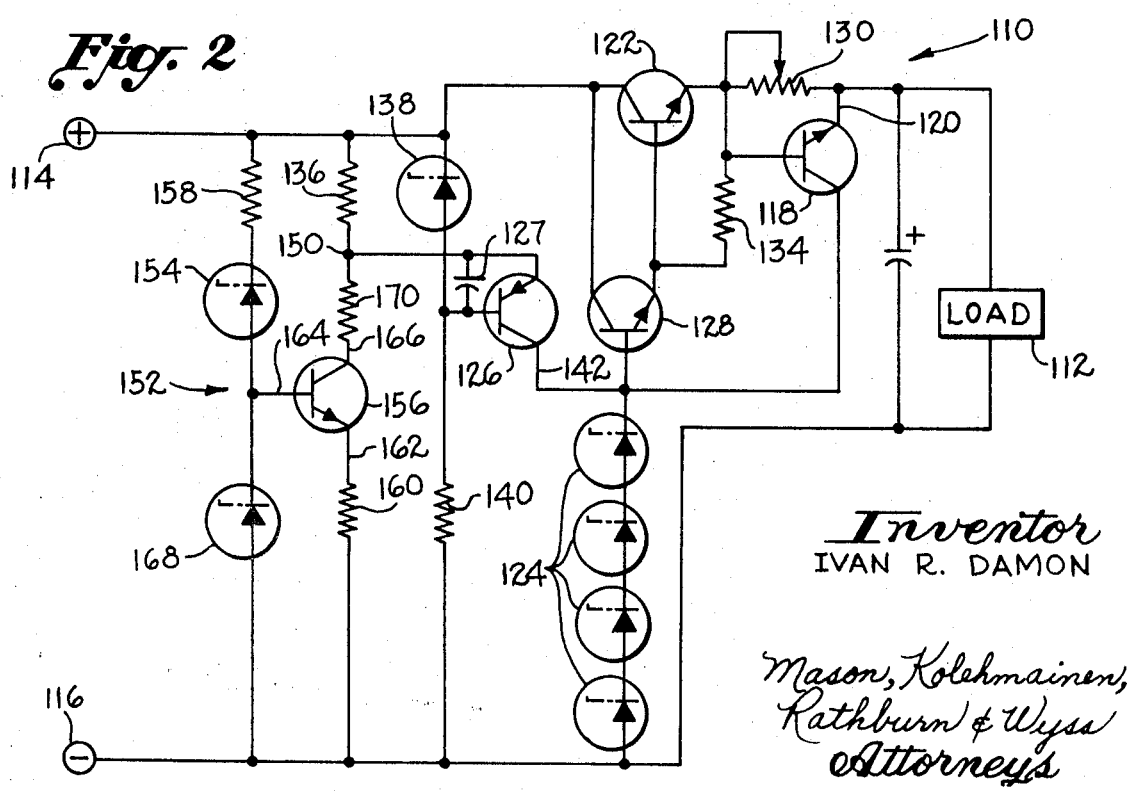

The invention, together with other objects and advantages thereof, will best be understood from considering the following detailed description in conjunction with the drawings wherein:

FIG. 1 is a schematic diagram of a constant current regulated power supply including a surge protection circuit designed in accordance with the present invention; and FIG. 2 is a schematic diagram of a constant voltage power supply that includes a surge protection circuit designed in accordance with the present invention.

Referring now to the drawings, FIG. 1 shows a constant current regulated power supply including a surge protection circuit designed in accordance with the present invention, and indicated generally as 10. Input voltage for the power supply 10 is supplied from positive and negative supply nodes respectively designated 14 and 16. The power supply 10 draws a constant current from the node 14, passes it through a load 12, and returns it to the node 16. In accordance with the teachings of the present invention, a surge protection circuit 52 supplies a shutdown current to a shutdown node 50 within the power supply 10 when the potential between the supply nodes 14 and 16 exceeds a predetermined maximum allowable value. The potential at which the protection circuit 52 shuts down the power supply 10 is determined by a Zener diode 54. The Zener diode 54 is connected in series with the base-emitter junction of a transmitter 56 directly across the supply nodes 14 and 16. A resistor 58 connected in series with the Zener diode 54 limits current drawn by the diode 54 to a safe value, and another resistor 60 connected between the emitter 62 of the transistor 56 and the supply node 14 limits current flow in the transistor 56.

Normally the voltage across the supply nodes 14 and 16 is of a lower magnitude than the Zener voltage of the Zener diode 54, and the Zener diode 54 remains nonconductive. No current flows into the base lead 64 of the transistor 56, and therefore no current flows out of the collector lead 66 of the transistor 56. During a potential surge, the voltage across the nodes 14 and 16 exceeds the Zener voltage of the diode 54, and current flows from the node 14, through elements 60, 56, 54, and 58 to the node 16. This current is amplified by the transistor 56 and appears as a shutdown current which flows out the collector lead 66 of the transistor 56 and into the shutdown node 50 of the regulated power supply 10, in a manner that will be explained in detail below.

To prevent the base-emitter voltage of transistor 26 from exceeding its safe operating limits and to limit the current in transistor 56, a Zener diode 68 is connected between the supply node 14 and the base lead 64 of the transistor 56. This second Zener diode 68 causes the three elements 56, 60, and 68 to function as a constant current source, and thereby limits the magnitude of the shutdown current to a safe value approximately equal to the Zener voltage of the diode 68 divided by the resistance of the resistor 60.

In the case of a prolonged surge, it is possible that current flow through the transistor 56 can cause excessive heating. Therefore a heat-dissipating resistor 70 is connected between the collector 66 of the transistor 56 and the shutdown node 50. The resistor 70 also provides some protection to the transistors 26 and 56 in case the Zener diode 68 should become open circuited.

Referring now to FIG. 2, there is shown a constant voltage regulated power supply designated generally as 110. The supply 110 draws current from a positive supply node 114, passes it to a load 112, and returns it to a negative supply node 116. The supply 110 is designed to maintain a constant voltage across the load 112. In accordance with the teachings of the present invention, a surge protection circuit 152 is arranged to turn off the power supply 110 if the voltage between the nodes 114 and 116 exceeds a predetermined safe maximum value. The surge protection circuit 152 supplies a shutdown current to a shutdown node 150 within the power supply 110 whenever an input voltage surge occurs. As will be explained below, this current causes the supply 110 to cease supplying current to the load 112.

Operation of the surge protection circuit 152 is identical to that of the circuit 52 shown in FIG. 1 except that the circuit 152 is designed to supply a shutdown current of the opposite polarity from that supplied by the circuit 52. The elements of the circuit 152 are numbered to correspond with those of the circuit 52. The Zener diode 154 connects to the positive node 114, and the emitter 162 of the transistor 156 connects to the negative supply node 116 through the resistor 160. The Zener diode 154 is oriented in the same way as the Zener diode 54, with its cathode lead pointing towards the positive supply node, but the transistor 156 is complementary to the transistor 56—that is, the transistor 156 is an NPN transistor, while the transistor 56 is a PNP transistor. In all other respects, the circuits 52 and 152 are essentially identical. When the potential between the supply nodes 114 and 116 exceeds the Zener voltage of the Zener diode 168, a shutdown current flows into the shutdown node 150 and causes the power supply 110 to cut off the flow of current to the load 112. When the potential between the supply nodes 114 and 116 once again returns to a safe value, the shutdown current is terminated and the power supply 110 returns to its normal mode of operation.

Referring again to FIG. 1, the power supply 10 is a constant current power supply, and it feeds a constant current to the load 12. Serially connected Zener diodes 18 and 20 limit the maximum output potential which can be applied to the load 12 and diodes 19 and 21 compensate for temperature drift in Zener diodes 18 and 20. A transistor 22 is the series regulating element, and a Zener diode 24 provides a reference potential. A diode 25 compensates for temperature drift. The Zener diode 24 is supplied with a constant current by a transistor 26, and resistors 36 and 40, and a Zener diode 38, which together comprise a constant current source. The Zener diode 24 thus presents a constant output potential to a transistor 28. The circuit 10 maintains the output current at a constant level by maintaining a constant voltage across a variable resistor 30 which is in series with the load 12 and the series regulating transistor 22. The transistors 28 and 22 act as emitter follower amplifiers. They maintain a constant voltage across the resistor 30 that is approximately equal to the voltage across the reference Zener diode 24. A resistor 32 in the collector circuit of the transistor 28 limits the maximum current which can flow through the base lead of the transistor 22, and thereby provides some protection to both the transistors 22 and 28 in case the Zener diode 24 becomes open circuited. This resistor also reduces the power dissipation in the transistor 28. A resistor 34 provides a low-impedance path between the emitter and the base of the series regulating transistor 22, thereby greatly reducing the amount of leakage output current which flows when the supply 10 is shut down. This resistor 34 greatly decreases the chances of the transistor 22 entering a destructive thermal runaway condition. The reference voltage supplied by the Zener diode 38 is sustained by current flowing from the positive node 14 through a resistor 40.

When the constant current regulated power supply 10 is shut down by an input voltage surge, a shutdown current from the surge protection circuit is fed into the node 50. This current builds up a voltage across the resistor 36 which is greater than the Zener voltage of the Zener diode 38, and therefore biases the constant current source transistor 26 into a nonconducting state. This deprives the Zener diode 24 of its sustaining current, and causes the Zener diode 24 to become nonconductive. This also deprives the transistor 28 of current sufficient to maintain conduction in the transistor 22. The transistor 22 then becomes nonconductive, and remains so until the flow of shutdown current into the node 50 from the surge protection circuit 52 is once again terminated. When this happens, the circuit 10 returns to its normal mode of operation.

Referring now to FIG. 2, the power supply 110 is seen to be of conventional design. It includes a series regulating transistor 122 which controls the flow of current to the load 112. A reference voltage is maintained across four serially connected Zener diodes 124 by current flow from a constant current source comprising resistors 136 and 140, a Zener diode 138, and a transistor 126. A transistor 128 and the series regulating element transistor 122 function as a Darlington amplifier and maintain a voltage across the load 112 that is approximately equal to the voltage across the Zener diodes 124. The diodes 124 may be replaced by a conventional power supply feedback amplifier, if desired. Resistor 134 functions to limit leakage current in the transistor 122 when the power supply 110 is shut down, thereby preventing thermal runaway of the transistor 122. Series resistor 130 measures current flowing to the load 112. When the load current becomes excessive, the voltage developed across the resistor 130 causes a transistor 118 to conduct and to short circuit the constant current from the transistor 126 to the emitter terminal 120 of the transistor 118. This causes the transistors 128 and 122 to cease conduction when the load 112 draws excessive current, thereby limiting the maximum possible output current to a safe value.

The shutdown node 150 is the junction point between the resistor 136 and the emitter of the transistor 126. When the shutdown current is fed into this node, the potential across the resistor 136 rises to a value in excess of the Zener voltage of the Zener diode 138, and causes the transistor 126 to become nonconductive. This terminates the flow of current to the base of the transistor 122. A shutdown current thus stops the flow of current to the load 112. When the shutdown current is terminated, the transistor 126 once again supplies current to the Zener diodes 124, and the power supply 110 immediately resumes its normal mode of operation.

A capacitor 127 is connected between the emitter and base elements of the transistor 127 to suppress spurious high frequency oscillations.

The constant current power supply 10 and the constant voltage power supply 110 have been selected as representative of the various types of power supplies with which the present invention can be used. Power supplies differ in design from one another, and it may be necessary to modify the surge protection circuit in order to facilitate its incorporation into a particular power supply. Some supplies do not have a convenient node into which a shutdown current can be fed, and may therefore require additional elements for converting the shutdown current into a suitable signal for shutting down the supply. In power supplies not utilizing a constant current source to supply a Zener voltage sustaining current, the shutdown current can be fed to a transistor that shorts out the Zener diode when it receives current, for example.

Although the present invention has been described with reference to an illustrative embodiment thereof it should be understood that numerous modifications and changes will readily occur to those skilled in the art and it is therefore intended by the appended claims to cover all such modifications and changes as fall within the true spirit and scope of the invention.

I claim:

1. A regulated power supply of the type in which a reference potential source is used as a standard against which the output voltage or current is compared, wherein the improvement comprises a surge protection circuit for turning off the supply when the potential input to the supply exceeds a predetermined potential level including a device that is normally nonconductive and that becomes conductive when subjected to a potential approximately equal in magnitude to said predetermined level, series circuit means connecting said device across the potential input to the supply, and shutdown means connected to the reference potential source for greatly reducing the magnitude of the reference potential upon sensing a flow of current through said device.

2. A surge protection circuit for turning off a regulated power supply when the potential input to the supply exceeds a predetermined potential level, said circuit comprising:
   a device that is normally nonconductive, and that becomes conductive when subjected to a potential approximately equal in level to said predetermined potential level;
   series circuit means connecting said device across the potential input to the supply;
   signal amplification means included in said series circuit means for producing a shutdown current in response to current flow through said device; and
   shutdown means within said supply for turning off said supply in response to said shutdown current.

3. A surge protection circuit in accordance with claim 2 wherein the device is a reverse-biased Zener diode having a Zener potential level approximately equal to said predetermined potential level.

4. A surge protection circuit in accordance with claim 2 wherein the series circuit means comprises the amplification means and at least one resistive element connected in series with said device to form a series circuit, and wherein said series circuit is connected across the potential input to the supply.

5. A surge protection circuit in accordance with claim 2 wherein the regulated power supply includes a potential reference device that is supplied with a current, and wherein the shutdown means comprises means for terminating this current whenever the shutdown current is flowing.

6. A surge protection circuit in accordance with claim 2 wherein the regulated power supply includes a reference potential, and wherein the shutdown means comprises means for greatly reducing the magnitude of this reference potential.

7. A surge protection circuit in accordance with claim 2 wherein the regulated power supply includes a series regulating element, and wherein the shutdown means comprises means for halting the flow of current through this series regulating element.

8. A surge protection circuit for turning off a regulated power supply when the potential input to the supply exceeds a predetermined potential level, said power supply including a constant current source having a shutdown node, said circuit comprising:
   a device that is normally nonconductive, and that becomes conductive when subjected to a potential approximately equal in level to said predetermined potential level;
   series circuit means connecting said device across the potential input to said supply; and
   amplification means for amplifying current flow through said device into a shutdown current which is fed into the shutdown node within the constant current source.

9. A surge protection circuit in accordance with claim 8 wherein the constant current source within the supply feeds current to a Zener diode reference potential circuit within the supply.

10. A surge protection circuit for generating a shutdown current in response to the potential level of a potential source exceeding a predetermined maximum, said circuit comprising:
   a device that is normally nonconductive, and that becomes conductive when subjected to a potential approximately equal in level to said predetermined level; and
   a series circuit connected across said potential source, and including:
      said device,
      a first current-limiting resistor connected directly to said device to form a series subcircuit,
      a transistor having emitter, base, and collector electrodes, and having its base electrode connected to said series subcircuit, and
      a second current limiting resistor connected to the emitter electrode of said transistor;
   whereby a shutdown current flows from the collector electrode of said transistor when the potential level of the potential source exceeds the predetermined maximum.

11. A surge protection circuit in accordance with claim 10 and further including a second Zener diode connecting the emitter electrode of said transistor to the end of said second current-limiting resistor that does not connect to the emitter of said transistor.

12. A regulated power supply for regulating the flow of power from a power source to a load, said supply comprising:
   a series regulating element;
   a first series circuit connected across said power source, and including said series regulating element and the load;
   a reference potential source;
   feedback circuit means for comparing the potential across said load with the potential across said reference potential source, and for adjusting the conduction of said series regulating element to maintain the ratio of these two potentials substantially constant;
   a device that is normally nonconductive and that becomes conductive when subjected to a potential which exceeds a predetermined potential level;
   a second series circuit connected across said power source and including said device; and
   shutdown means responsive to current flow through said device for greatly reducing the potential generated by the reference potential source, whereby the power supply ceases to pass current to the load when the potential of the power source exceeds a predetermined potential level.

13. A regulated power supply in accordance with claim 12 which also includes a constant source supplying a constant current to the regulating element, and wherein the shutdown means stops the flow of current from the constant current source.

14. A surge protection circuit for turning off a regulated power supply when the potential input to the supply exceeds a predetermined potential level, said circuit comprising:
   a device that is normally nonconductive and that becomes conductive when subjected to a potential approximately equal in level to said predetermined potential level;
   series circuit means connecting said device across the potential input to the supply;
   signal amplification means comprising a transistor having emitter and base leads included in said series circuit means and having a collector lead out of which a shutdown current flows in response to current flow through said device; and
   shutdown means within said supply for turning off said supply in response to said shutdown current.

15. A surge protection circuit for turning off a regulated power supply when the potential input to the supply exceeds a predetermined potential level, said circuit comprising:
   a device that is normally nonconductive, and that becomes conductive when subjected to a potential approximately equal in level to said predetermined level;
   series circuit means connecting said device across the potential input to said supply;
   amplification means for amplifying current flow through said device into a shutdown current; and
   a constant current source comprising a reference potential source having two terminals; a transistor having emitter, base, and collector electrodes, and having its base electrodes connected to one terminal of said reference source, and having the constant current flowing from its collector electrode; and a resistor connecting the emitter electrode of said transistor to the remaining terminal of said reference potential source, said shutdown current being fed into the node formed by the junction of said resistor with said emitter electrode.

16. A regulated power supply for regulating the flow of power from a power source to a load, said supply comprising:
   a series regulating element;

a first series circuit connected across said power source and including said series regulating element and the load;
a reference potential source;
feedback circuit means for comparing the potential across said load with the potential across said reference potential source and for adjusting the conduction of said series regulating element to maintain the ratio of these two potentials substantially constant;
a device that is normally nonconductive and that becomes conductive when subjected to a potential which exceeds a predetermined potential level;
a second series circuit connected across said power source and including said device;
shutdown means responsive to current flow through said device for producing a current; and
a transistor connected to said reference potential source and to the current generated by the shutdown means in such a manner that current flow from the shutdown means causes the transistor to reduce the magnitude of the reference potential, whereby the power supply ceases to pass current to the load when the potential input to the power source exceeds a predetermined potential level.